US010019635B2

(12) United States Patent
Kido et al.

(10) Patent No.: US 10,019,635 B2
(45) Date of Patent: Jul. 10, 2018

(54) VEHICLE-MOUNTED RECOGNITION DEVICE

(71) Applicant: Hitachi Automotive Systems, Ltd., Hitachinaka-shi, Ibaraki (JP)

(72) Inventors: Hideaki Kido, Tokyo (JP); Takeshi Nagasaki, Hitachinaka (JP); Shinji Kakegawa, Tokyo (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 56 days.

(21) Appl. No.: 15/102,746

(22) PCT Filed: Jan. 7, 2015

(86) PCT No.: PCT/JP2015/050202
§ 371 (c)(1),
(2) Date: Jun. 8, 2016

(87) PCT Pub. No.: WO2015/122212
PCT Pub. Date: Aug. 20, 2015

(65) Prior Publication Data
US 2016/0314364 A1 Oct. 27, 2016

(30) Foreign Application Priority Data

Feb. 17, 2014 (JP) ................................. 2014-027791

(51) Int. Cl.
*G06K 9/00* (2006.01)
*G01C 3/06* (2006.01)
(Continued)

(52) U.S. Cl.
CPC ........... *G06K 9/00805* (2013.01); *G01C 3/06* (2013.01); *H04N 13/0022* (2013.01);
(Continued)

(58) Field of Classification Search
CPC combination set(s) only.
See application file for complete search history.

(56) References Cited

U.S. PATENT DOCUMENTS 7,003,136 B1 * 2/2006 Harville ............. G06K 9/00201
348/169
8,818,026 B2 * 8/2014 Kiyohara ............... G01C 21/26
382/103
(Continued)

FOREIGN PATENT DOCUMENTS

EP 2 293 588 A1 3/2011
EP 2293588 A1 * 3/2011 ............... B60R 1/00
(Continued)

OTHER PUBLICATIONS

Extended European Search Report issued in counterpart European Application No. 15749369.3 dated Jun. 19, 2017 (10 pages).
(Continued)

*Primary Examiner* — Anand Bhatnagar
(74) *Attorney, Agent, or Firm* — Crowell & Moring LLP

(57) ABSTRACT

An objective of the present invention is to obtain a vehicle-mounted recognition device capable of recognizing an object to be recognized in a shorter processing time than previously possible. This vehicle-mounted recognition device recognizes an object to be recognized from any image of a pair of images captured simultaneously by a pair of image capture units, said vehicle-mounted recognition device comprising: a disparity measurement unit which measures disparity using the pair of images; an object information estimation unit which estimates the present location of the object from a previous location of the object; a concealment determination unit which determines whether the object is concealed in at least one of the pair of images on the basis of the result of the measurement by the disparity measurement unit and the result of the estimation by the
(Continued)

object information estimation unit; an image selection unit which selects the image in which the object can be recognized from among the pair of images on the basis of the result of the determination by the concealment determination unit; and an object recognition unit which recognizes the object using the selected image.

6 Claims, 13 Drawing Sheets

(51) Int. Cl.
  *H04N 13/00* (2018.01)
  *H04N 13/02* (2006.01)
  *H04N 7/18* (2006.01)
(52) U.S. Cl.
  CPC ........... *H04N 13/0239* (2013.01); *H04N 7/18* (2013.01); *H04N 2013/0081* (2013.01)

(56) References Cited

U.S. PATENT DOCUMENTS

| | | | | |
|---|---|---|---|---|
| 9,066,085 | B2* | 6/2015 | Cluff | H04N 13/0246 |
| 2008/0192984 | A1* | 8/2008 | Higuchi | G08G 1/16 |
| | | | | 382/104 |
| 2012/0224747 | A1* | 9/2012 | Higuchi | G08G 1/16 |
| | | | | 382/103 |
| 2012/0269382 | A1* | 10/2012 | Kiyohara | G01C 21/26 |
| | | | | 382/103 |
| 2013/0300872 | A1* | 11/2013 | Park | B60R 1/00 |
| | | | | 348/148 |
| 2014/0168377 | A1* | 6/2014 | Cluff | H04N 13/0246 |
| | | | | 348/47 |
| 2015/0042766 | A1* | 2/2015 | Ciurea | H04N 13/0022 |
| | | | | 348/48 |
| 2015/0042767 | A1* | 2/2015 | Ciurea | H04N 13/0022 |
| | | | | 348/48 |
| 2016/0014406 | A1* | 1/2016 | Takahashi | G06T 7/73 |
| | | | | 348/148 |
| 2016/0261848 | A1* | 9/2016 | Sekiguchi | B60R 1/00 |

FOREIGN PATENT DOCUMENTS

| | | |
|---|---|---|
| JP | 8-247775 A | 9/1996 |
| JP | 2002-56377 A | 2/2002 |
| JP | 2006-3994 A | 1/2006 |
| JP | 4654208 B2 | 3/2011 |

OTHER PUBLICATIONS

Lankton, "3D Vision with Stereo Disparity", Shawn Lankton Online, Dec. 19, 2007, http:/www.shawnlankton.com/2007/12/3d-vision-with-stereo-disparity/ (18 pages), XP055378871.

International Search Report (PCT/ISA/210) issued in PCT Application No. PCT/JP2015/050202 dated Mar. 31, 2015 with English-language translation (two (2) pages).

Japanese-language Written Opinion (PCT/ISA/237) issued in PCT Application No. PCT/JP2015/050202 dated Mar. 31, 2015 (four (4) pages).

\* cited by examiner

VEHICLE-MOUNTED RECOGNITION DEVICE

TECHNICAL FIELD

The present invention relates to a vehicle-mounted recognition device which recognizes an object through image processing.

BACKGROUND ART

In recent years, a vehicle-mounted image recognition system is widely spread which recognizes surrounding vehicles and running lane through a vehicle-mounted camera to prevent an accident from happening. The recognition target objects are diversified, and besides the vehicle, a pedestrian and a road speed sign are included as the recognition target. As a solution, there is a technique of a stereo camera which measures a distance based on the principle of triangulation using two cameras. In the stereo camera, corresponding points of two cameras in a horizontal direction are obtained, and displacement therebetween is set as a disparity. A distance from the subject vehicle to the corresponding points is calculated based on the disparity and is held as a distance image. Then, since cameras are used in the stereo camera, besides the measurement of the distance by the disparity, for example, the object can be recognized using appearance pattern information itself captured by the camera.

PTL 1 discloses a technique of recognizing a sign using the stereo camera. In the technique of PTL 1, an area of the sign is first estimated in the distance image, an approximate size of the sign is estimated from the distance, and then a template matching is performed according to the size so as to recognize the sign.

PTL 2 discloses a vehicle-mounted image recognition system using a plurality of cameras (not limited to the stereo camera) in which, when the object of the detection target cannot be recognized due to a stain of a lens in one camera, a recognition process is performed by another camera to find out the object of the detection target. In the technique of PTL 2, even when the object cannot be recognized in any one of images, the object can be found in the other image, so that detection missing can be prevented.

CITATION LIST

Patent Literature

PTL 1: Japanese Patent Application Laid-Open No. 2006-3994
PTL 2: Publication of U.S. Pat. No. 4,654,208

SUMMARY OF INVENTION

Technical Problem

However, in the method of recognizing the sign disclosed in PTL 1, the sign is recognized only by one of two images. Therefore, in a case where the object is not shown in one image but found in the other image, the sign cannot be recognized.

In the case of the technique disclosed in PTL 2, the detection missing can be prevented by recognizing both images. However, since the recognition process is respectively performed on the plurality of images, a lot of processing time is taken compared to the recognition process which is performed on only one image. In particular, in an embedded system of which calculation resources are tight, there is a request for reducing the processing time as short as possible.

The invention has been made in view of the above problems, and an object thereof is to provide a vehicle-mounted recognition device which can recognize a target in a short processing time.

Solution to Problem

According to the invention in order to solve the above problems, there is provided a vehicle-mounted recognition device which recognizes a target from any one of a pair of images simultaneously captured by a pair of image capture units. The vehicle-mounted recognition device includes a disparity measurement unit which measures a disparity using the pair of images, an object information estimation unit which estimates a current position of the object from a past position of the object, a concealment determination unit which determines whether concealment of the target occurs in at least one of the pair of images based on a measurement result of the disparity measurement unit and an estimation result of the object information estimation unit, an image selection unit which selects an image, from which the target is recognizable, from the pair of images based on a determination result of the concealment determination unit, and an object recognition unit which recognizes the target using the selected image.

Advantageous Effects of Invention

According to the invention, even in a case where a target is captured only by one camera due to an object interposed with respect to the target, a recognition process is not performed on both image but only one image, so that a total processing time can be reduced. Further, objects, configurations, and features other than those described above will become clear through the explanation about the following embodiments.

DESCRIPTION OF EMBODIMENTS

Figure 1:
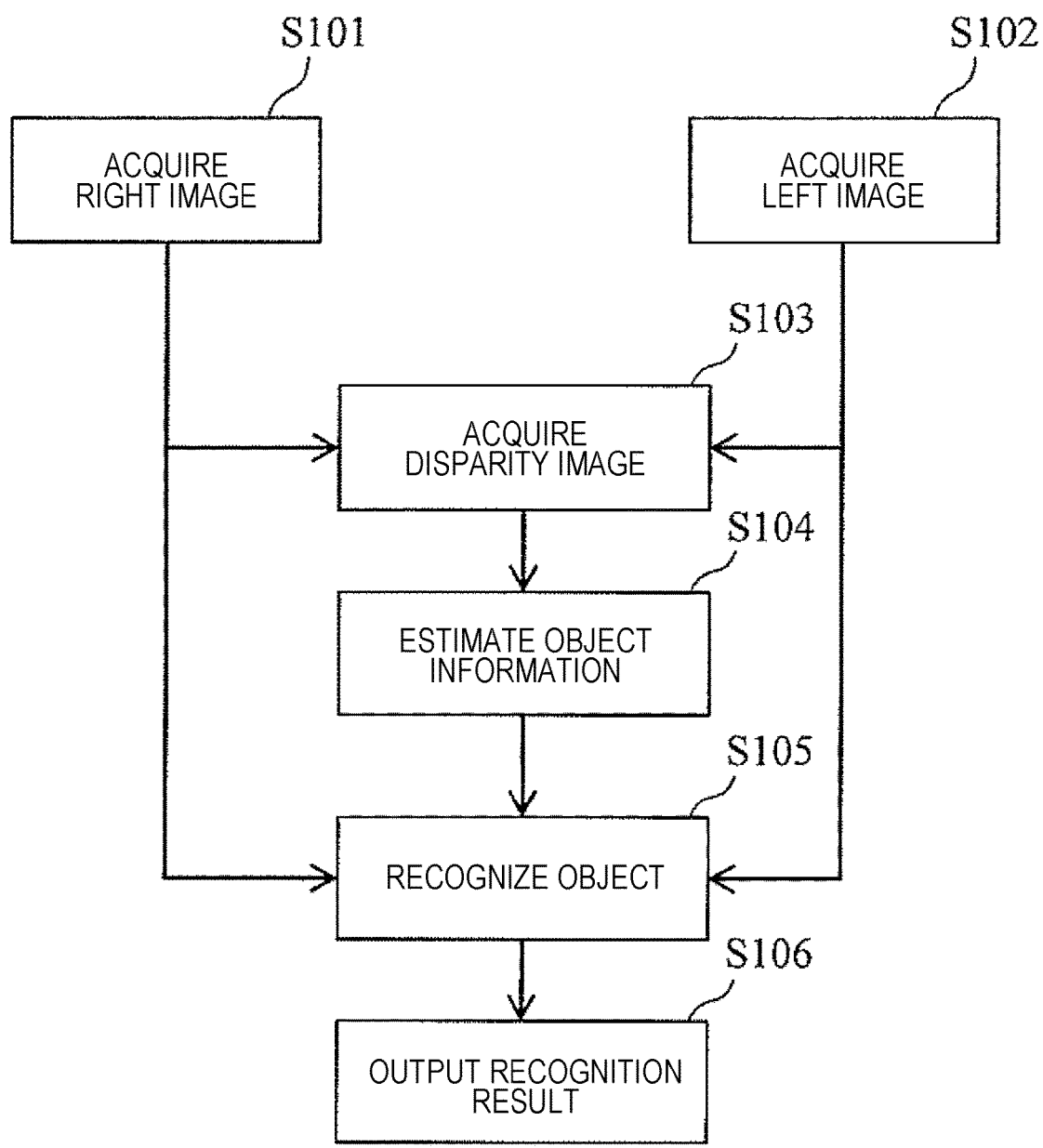
FIG. 1 is a flowchart illustrating an exemplary process of an image recognition system using a stereo camera.

Hereinafter, embodiments of the invention will be described in detail with reference to the drawings. FIG. 1 is a flowchart illustrating an exemplary process of an image recognition system using a stereo camera.

The stereo camera is mounted in a vehicle, and includes a pair of right and left image capture units (cameras) which capture the front side of the vehicle. In the stereo camera, a right image and a left image are respectively acquired by the pair of image capture units (S101, S102). Then, a distance up to an object captured by the principle of triangulation is measured based on a difference between appearance patterns in the right and left images. In order to measure a distance, when two image capture units capture the same object, a disparity which is an index indicating a separation degree of the object on two image coordinates of the right and left images is obtained, and a disparity image is generated (S103).

Figure 2:
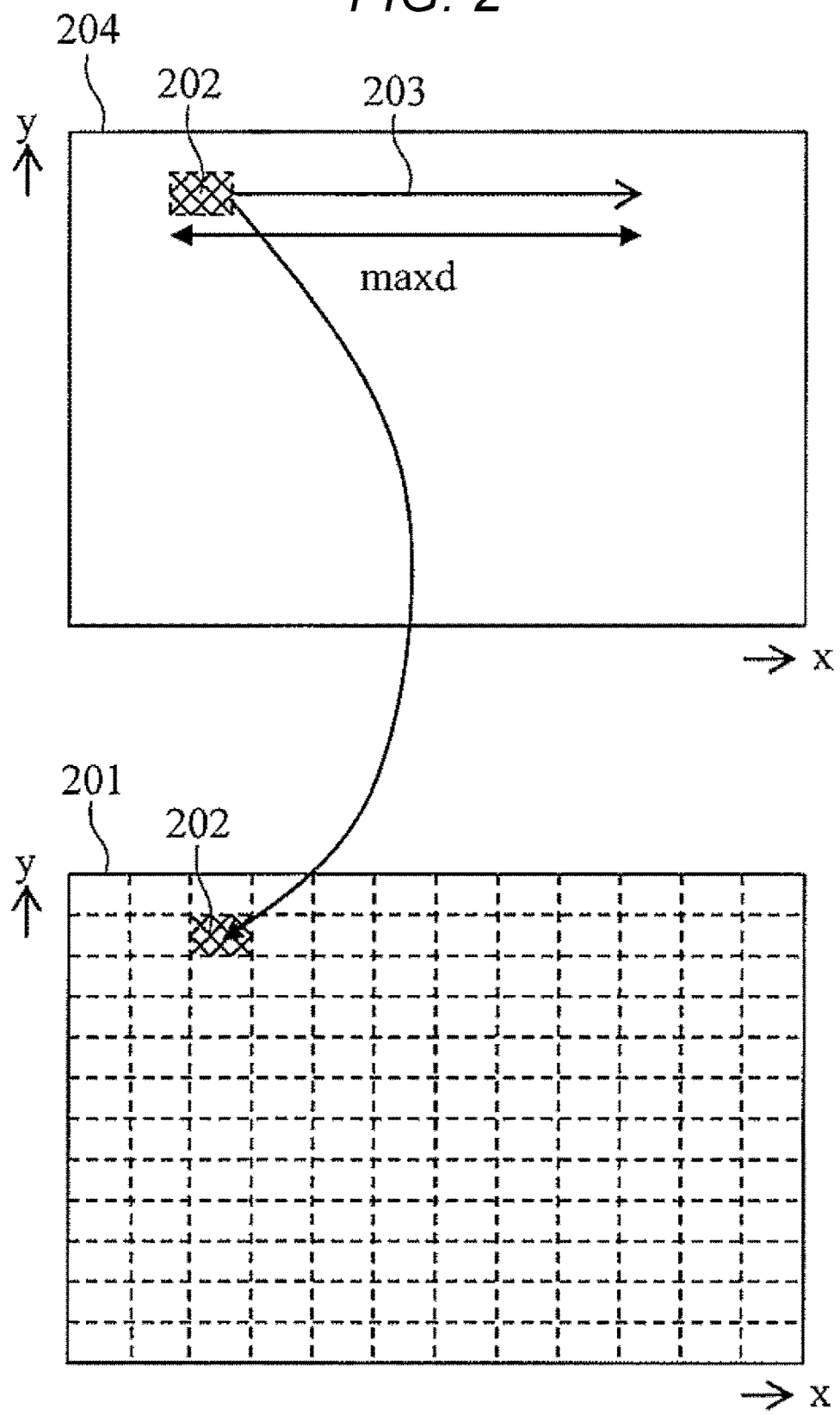
FIG. 2 is a diagram for describing a specific example of disparity deduction.

FIG. 2 is a diagram for describing a specific example of disparity deduction. First, any one of the right image and the left image is determined as an image serving as a standard, and the standard image is partitioned and divided into small rectangular block images. The image serving as a standard herein will be called as a standard image 201, and is set as a right image (IR(x, y)) in the following description if not otherwise specified. After the standard image 201 is divided into the small rectangular block images 202, an area matched with each rectangular block image is retrieved by a pixel length maxd in a horizontal direction (x direction) 203 from the other image 204. The other image thus retrieved is called a reference image 204, and is set as a left image (IL(x, y)) in the following description if not otherwise specified. Further, (x, y) represents the image coordinates. When the coordinates from which the retrieving of a certain block starts in the left image is set to be equal to the coordinates of the right image from which the block is extracted, displacement in the retrieving from the coordinates is set as "d", and similarity indicating a matching rate between the blocks in the displacement d is set as S(x, y, d), a disparity Dr(u, v) is obtained as follows.

$$Dr(u,v)=\mathrm{argmax}(S(x,y,d)) \quad \text{(Equation 1)}$$

Herein, argmax represents a function of outputting d (0≤d≤maxd) causing the largest S.

In addition, a relation between the disparity image coordinates u, v and the coordinates x, y of the standard image is set as the following equation (where, sx and sy represent horizontal and vertical block sizes).

$$u=x*sx, \ v=y*sy \quad \text{(Equation 2)}$$

The disparity Dr may be used as a disparity image D as it is, but herein the disparity image D is generated as described below.

The reference image is partitioned into blocks, and the retrieving is made in the horizontal direction with respect to the standard image. In this case, the retrieving direction is set to a direction opposed to the horizontal direction 203. Similarly to the disparity Dr, Dl is obtained, and the final disparity image is obtained using an appropriate threshold Td as follows.

$$D(u,v)=\mathrm{if}(|Dr(u,v)-Dl(u-Dr(u,v),v)|<Td)$$

then Dr(u, v)

else ϕ

This process is called a right and left image check. In other words, when the disparity image is generated, the block is created from the right image and the disparity image Dr is generated based on the right image, and the block is created from the left image and the disparity image Dl is generated based on the left image. Then, the disparity image D is generated by comparing the disparity image Dr with the disparity image Dl (a disparity image generation unit). This method is used for suppressing a mismatching. "ϕ" represents a state where the disparity is invalid. For example, in a case where an object is concealed by another object in front of the object in one image, it is not possible to obtain the disparity because there is no matched portion between the blocks at the time of the retrieving process. Besides the right and left image check, the determination of "ϕ" is performed based on the size of S (x, y, d) which is minimized at the time of matching.

For example, assuming that the disparity of a detection target object is assigned with D(uo, vo), the distance (Z) up to the object can be obtained by the following equation using the disparity, a focal distance (f) of a lens of the image capture unit, a pixel interval (δ) of the capture element, and a baseline length (b) between the image capture units.

$$Z=b*f/(D(uo,vo)*\delta) \quad \text{(Equation 3)}$$

After the disparity image D(u, v) is obtained, an object information estimation process is performed in which narrowing is performed to find out an object (target) of a detection target (S104). As a processing method, for example, (1) near areas having a similar disparity are collected and labeled, and the areas are considered as one object. It is expected that the same object is assigned with the same label. (2) The approximated position of the detection target object is narrowed down from appearance pattern information. (3) When there is recognition information of the last frame, the current position is estimated from behavior of the subject vehicle based on the recognition information.

In the following description, a disparity label image in a case where the above (1) processing method is used is represented as L(u, v). Through the above processing method, object recognition for specifying an identity of the object is performed by analyzing the shape of the area assigned with the same label in L(u, v) with respect to the narrow-down area and the appearance pattern of the original standard image IR(x, y) (S105). Examples of the identity include a road sign, a pedestrian, a preceding vehicle, and the like. Further, appearance information at a position (u, v) can be obtained directly from (Equation 2). The result is transferred to a display or a control device (S106).

Various objects are considered as the detection target object and, in this embodiment, the type of a road sign will be considered as a recognition target. For example, in the case of a speed sign, the pattern displayed in the sign is necessarily recognized as 30 km/h, 40 km/h, or the like.

Figure 4:
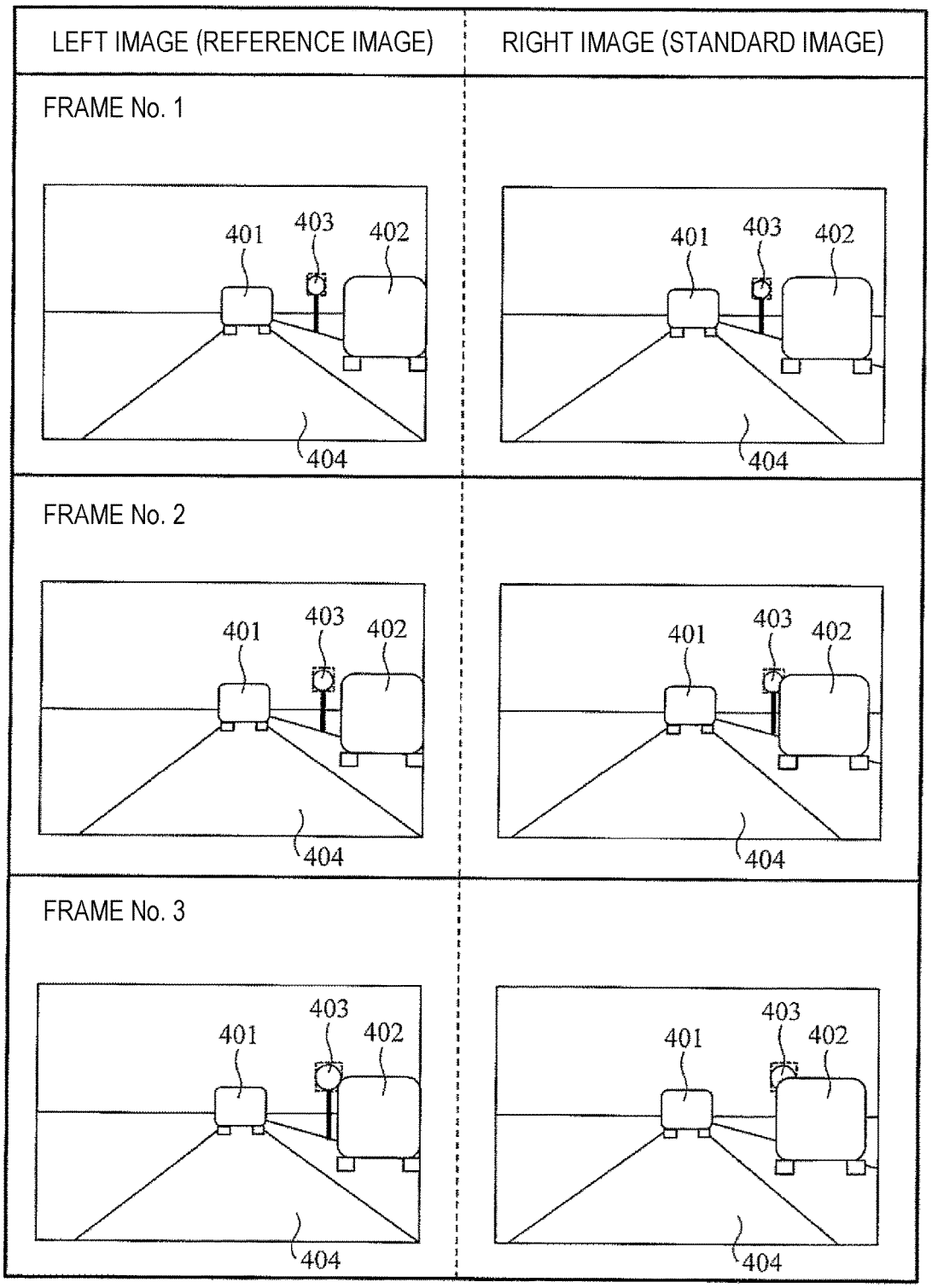
FIG. 4 is a diagram illustrating an exemplary image in which a sign becomes invisible in a right image.
Figure 5:
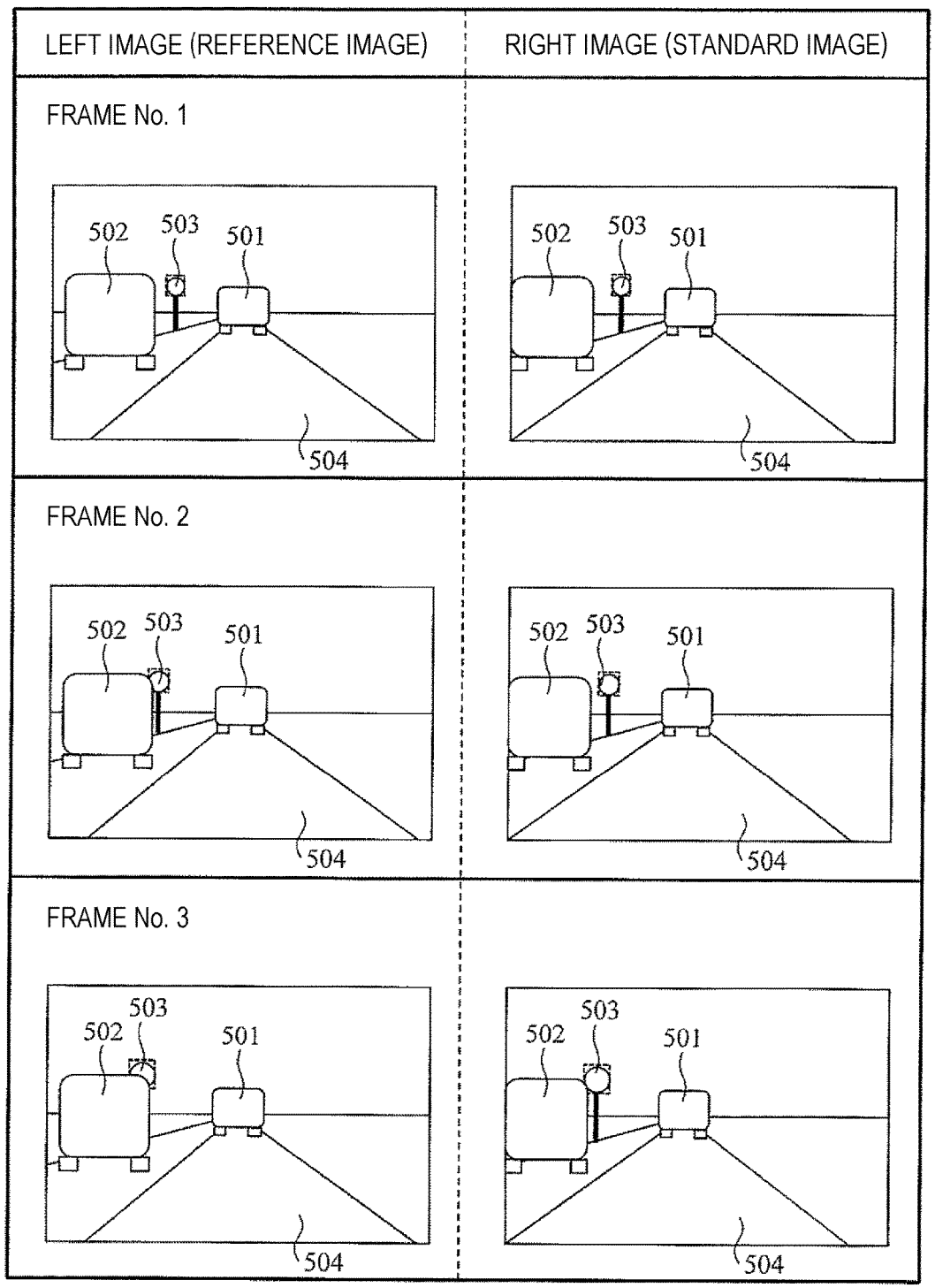
FIG. 5 is a diagram illustrating an exemplary image in which a sign becomes invisible in a left image.

FIG. 4 is a diagram illustrating an exemplary image in which the sign is invisible in the right image. FIG. 5 is a diagram illustrating an exemplary image in which the sign is invisible in the left image.

FIG. 4 illustrates an example in which right and left images time-sequentially captured by the stereo camera are illustrated and an object 403 of the detection target is concealed by another object 402 in front thereof. The time-sequential images show an example in which the subject vehicle moves forward and the preceding vehicle 401 and the vehicle 402 on the right side also move forward in the same direction as the subject vehicle at a constant speed. Frame No. 1 to Frame No. 3 are sequentially captured in a predetermined time interval.

An object drawn with rectangular and circle on the right side in each image indicates an example of a road sign 403. The road sign 403 is provided at the right end of a road 404, and displayed in both right and left images in Frame No. 1. However, the road sign is concealed by the shadow of the other vehicle 402 which moves forward together with the subject vehicle in the right image of Frame No. 2, and thus a portion of the road sign 403 becomes invisible. On the other hand, since the position of the left image capture unit is shifted and separated on the left side from the right image capture unit, the entire road sign 403 gets out of the shadow of the shadow of the vehicle 402 and is visible in the left image of Frame No. 2. The sign 403 is concealed by the shadow of the vehicle 402 in the right image of Frame No. 3 and almost the entire sign 403 becomes invisible. On the other hand, the sign gets out of the shadow of the vehicle 402 and is visible in the left image of Frame No. 3.

FIG. 5 illustrates an example in which the right and left of the invisible image is reversed to that of FIG. 4. A road sign 503 is provided at the left end of a road 504, and the road sign 503 is visible in the right and left images in Frame No. 1. However, the sign 503 is concealed by the shadow of a vehicle 502 in the left image of Frame No. 3, and thus almost the entire sign 503 is invisible, and the sign 503 gets out of the shadow of the vehicle 502 and is visible in the right image of Frame No. 3.

For example, in the situations of Frame No. 2 and Frame No. 3 of FIG. 4 or 5, the appearance pattern is different in the right and left images. Therefore, the disparity is not obtained (D(u, v)=φ), and it is not possible to narrow down the areas even simply using the label image generated based on the disparity image. In this case, the position and the distance in the current frame are predicted based on the past detection result and the vehicle behavior.

Specifically, when the vehicle behavior between the last frame and the current frame is expressed by $\Delta P$ on the world coordinate system based on a yaw rate sensor, a vehicle speed sensor, and information on the image, and the position of the sign recognized in the last frame is expressed by P(t−1), the position P(t) of the sign in the current frame can be expressed by P(t−1)+$\Delta P$. The position of the detection object of the current frame in the image coordinate system can be predicted by converting the coordinates into the image coordinate system. The above example is not limited to the road sign, and may be applied to any object as long as the target is a stationary object.

In a case where the target is a moving object, the position Q(t) of the moving object in the current frame can be expressed as Q(t−1)+$\Delta Q$ (where, $\Delta Q$ represents relative displacement of the subject vehicle with respect to the moving object between the frames, and Q(t−1) represents the position of the sign recognized in the last frame). In this way, the position predicted based on the past detection result and the vehicle behavior is denoted by a predicted position (up, vp). Further, the disparity in the current frame can also be predicted based on the predicted position in a depth direction, and the disparity is described below as a predicted disparity dp.

Figure 3:
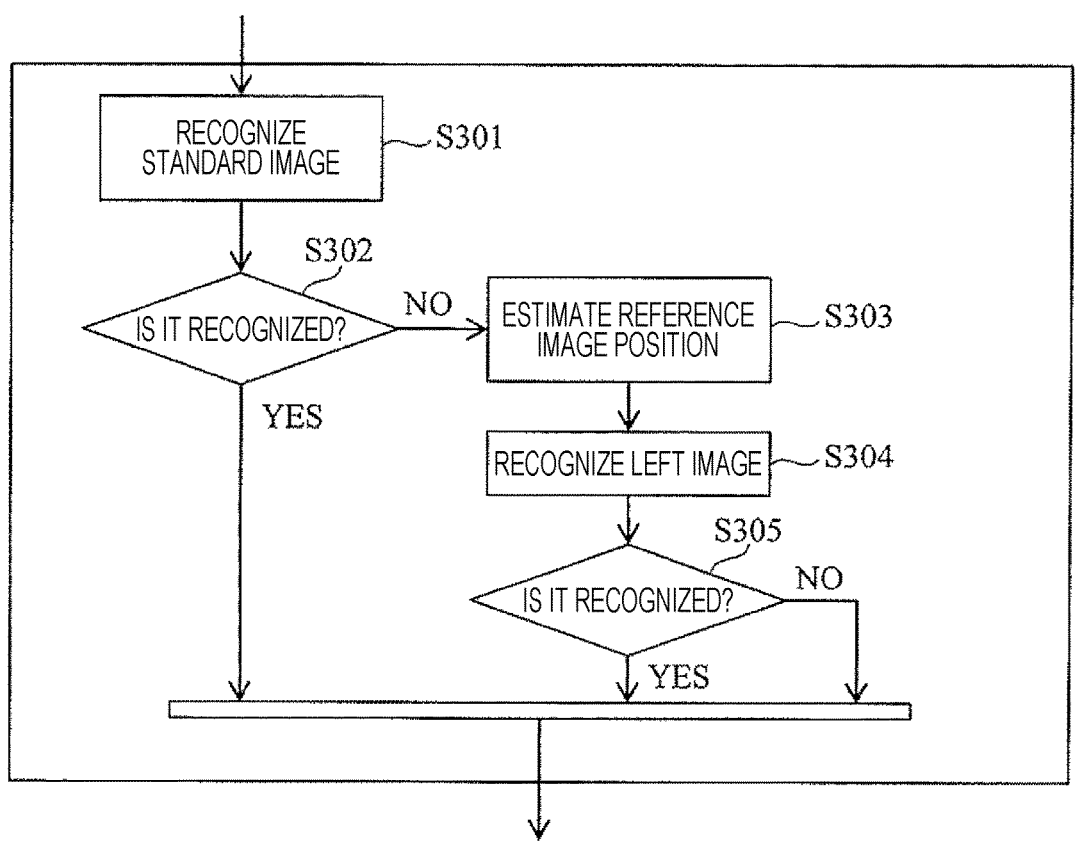
FIG. 3 is a diagram illustrating a conventional exemplary process of recognizing a reference image after a standard image.

When there is the predicted position, the areas can be narrowed down, so that the recognition process can be performed. A process flow of recognizing the sign in such a case is illustrated in FIG. 3. FIG. 3 is a diagram illustrating a conventional exemplary process of recognizing the reference image after the standard image.

In the conventional example illustrated in FIG. 3, the target is first recognized by the standard image. Herein, as illustrated in FIG. 5, when the target is concealed only in the reference image, the appearance pattern information is present in the standard image, so that the target can be recognized (YES in S302).

However, as illustrated in Frames No. 2 and 3 of FIG. 4, in a case where the target is concealed only in the standard image, there is no appearance pattern information, and thus the target cannot be recognized (NO in S302).

Therefore, in order to recognize the object in the reference image, first, a predicted position when the target is shown in the reference image (IL) from the predicted disparity dp is estimated (S303). The position of the target in the reference image can be obtained as (IL(up+dp, vp)). When the recognition process is performed in the reference image (the left image) using the appearance pattern information of the place, the target can be recognized even in such cases of Frames No. 2 and 3 of FIG. 4. In a case where the target is concealed in both right and left images (NO in S305), it is determined that the target cannot be recognized, and the recognition process is not performed.

In the case of the above-described conventional example, in the situations of Frames No. 2 and 3 of FIG. 4, there is a need to perform the recognition process twice in the standard image and the reference image. Therefore, there is a problem that it takes a processing time. It is desirable to shorten the processing time by suppressing the number of times of the recognition process.

Figure 6:
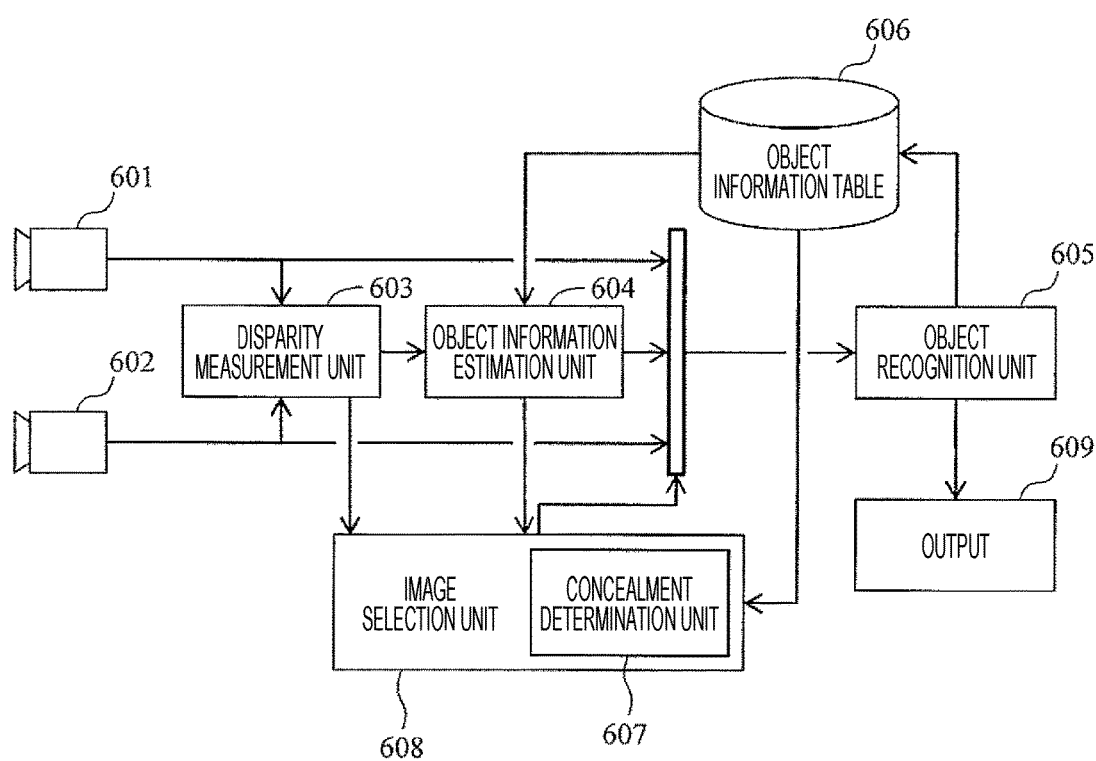
FIG. 6 is a diagram illustrating an exemplary configuration of the image recognition system using the stereo camera.

FIG. 6 is a diagram illustrating an exemplary configuration of the image recognition system using the stereo camera in this embodiment. First, a pair of right and left images simultaneously captured by a pair of right and left image capture units 601 and 602 are input to a disparity measurement unit 603. The disparity measurement unit 603 calculates a disparity according to the input images, and generates the disparity image in which the disparity is expressed by shading. An object information estimation unit 604 estimates object information such as position, size, and distance of the target using the disparity image and the past object information registered in an object information table 606 described below. In the past object information, the past position of the target and a range occupied by the target on the image at that time are included. Herein, the predicted position (up, vp) and the predicted disparity dp are estimated. In addition, the size of the target to be estimated is a predicted range which is predicted to be occupied by the target on the image.

Next, an image selection unit 608 selects any one of the right and left images, and an object recognition unit 605 detects the object using the appearance pattern information and the estimated information in the object information estimation unit 604 in the selected image. The image selection unit 608 selects any one of the pair of images using the determination result of a concealment determination unit 607. The position information and the distance information detected by the object recognition unit 605 are stored in the object information table 606. Then, the recognition result of the object is output to an output unit 609.

Figure 7:
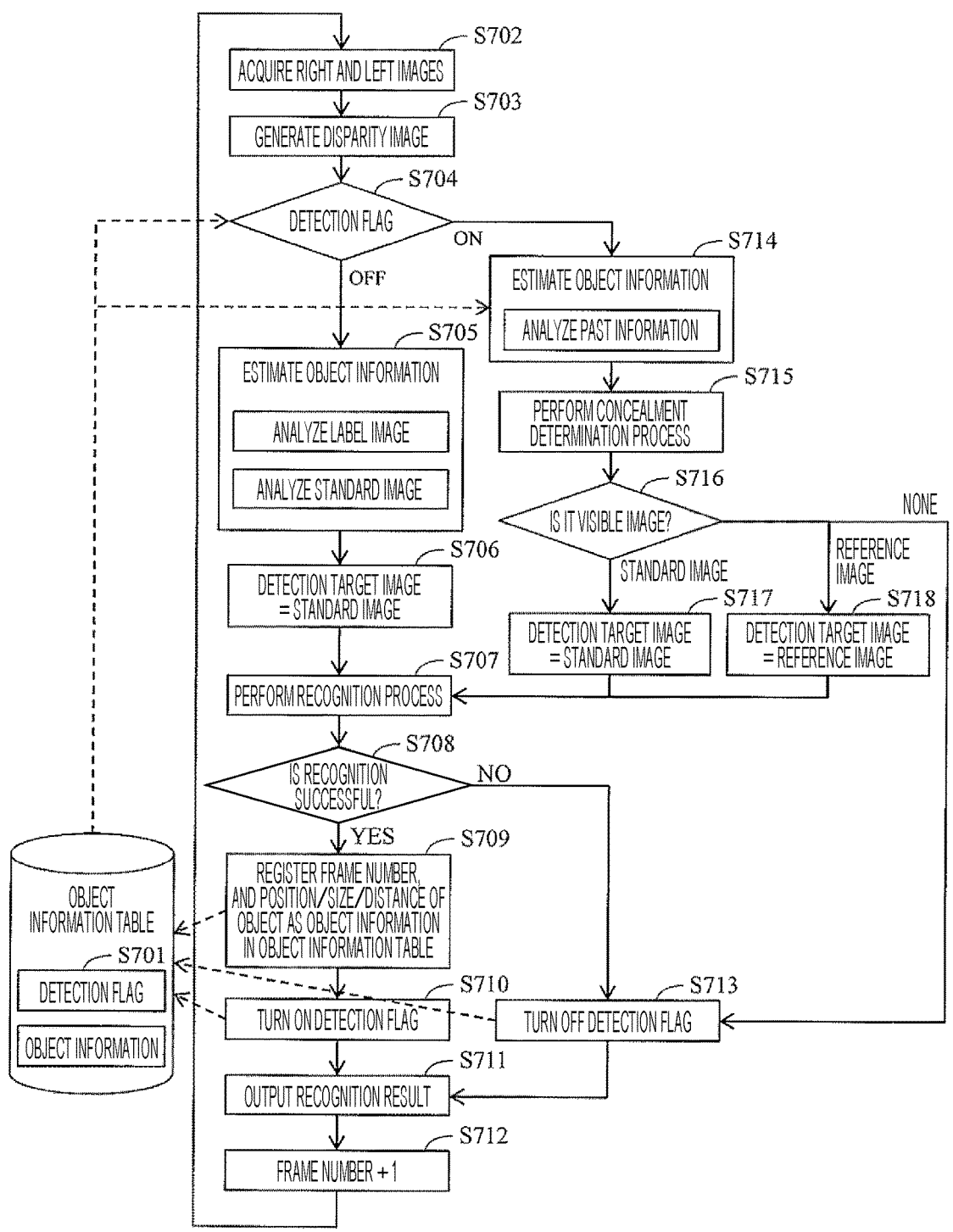
FIG. 7 is a flowchart illustrating an exemplary process of object recognition.

FIG. 7 is a flowchart illustrating an exemplary process of the object recognition based on the configuration of FIG. 6. First, the description will be made about a case where the target is initially detected in Frame No. 1. The initial detection indicates that the target is not detected in the past but new object is recognized in the frame for the first time. The information indicating whether the target is detected in the past is set to a detection flag (S704) and managed in the object information table 606. In general, there are a plurality of targets, but the description in this embodiment will be made about one object for the sake of simplicity in explanation. When there is a target, the detection flag is set to ON and, if not, the detection flag is set to OFF. In the beginning, it is assumed that there is no information in the past.

First, the right and left images are acquired (S702), and the disparity image is generated (S703). Next, it is determined whether the detection flag is set to ON or OFF in order to determine whether there is the past information (S704). Since the detection flag at this time is OFF, the procedure moves to an initial detection flow.

In the initial detection flow, as described above, distance label information L and appearance information of the image are directly processed to perform the object information estimation process (S705). Then, the standard image (the right image in this embodiment) in the pair of right and left images is selected as a detection target image (S706). This process corresponds to the process of the image selection unit 608 in FIG. 6.

Next, the recognition process is performed in which the object is detected using the standard image (the detection target image) (S707). Herein, in a case where the target is detected from the standard image (YES in S708), the object information of the target is registered in the object information table 606 (S709). The object information to be registered includes the information of the frame number, type/position/distance of the target with respect to the subject vehicle, and the size information of the target. For example, in a case where the target is a road sign, the type/position/size/distance of the road sign are registered as the object information of Frame No. 1. At this time, the detection flag is changed to ON (S710). On the other hand, in a case where the target is not detected from the standard image (NO in S708), the detection flag is set to OFF (S713).

Next, the description will be made about the case of Frame No. 2. Similarly to the case of Frame No. 1, the right and left images are acquired and the disparity is measured (S702, S703), and it is determined whether there is the past information (S704). In this process, since the detection flag is set to ON, the position/size/distance (disparity) of the object in the current frame is estimated from the past information in the object information estimation process (S714). Herein, in addition to the predicted position (up, vp) and the predicted disparity dp of the target described above, the estimated size (sxp, syp) is obtained. Herein, the estimated size sxp indicates a size in the x direction of the target in the image, and the estimated size syp indicates a size in the y direction of the target in the image. In a case where the target is circular like the speed sign (the case of a circle), the radius rp of the speed sign may be registered in the object information table 606.

Next, a concealment determination process is performed to determine whether there is another object at the predicted position (up, vp) of the target with respect to the subject vehicle so as to conceal the target (S715). The detailed content of the concealment determination process will be described below. Based on the determination result of the concealment determination process (S715), one of the right and left images is determined as the detection target image from which the appearance pattern information is acquired (S716). For example, in the concealment determination process (S715), in a case where a visible image (an image in which the target is shown) is the standard image (the right image), the standard image is selected as the detection target image (S717). Then, in a case where the visible image is the reference image (the left image), the reference image is selected as the detection target image (S718). Then, in a case where it is determined in the concealment determination process (S715) that there is no visible image (that is, it is determined that the target is not shown in both of the standard image and the reference image), the recognition process is not performed and the detection flag is set to OFF (S713).

Figure 8:
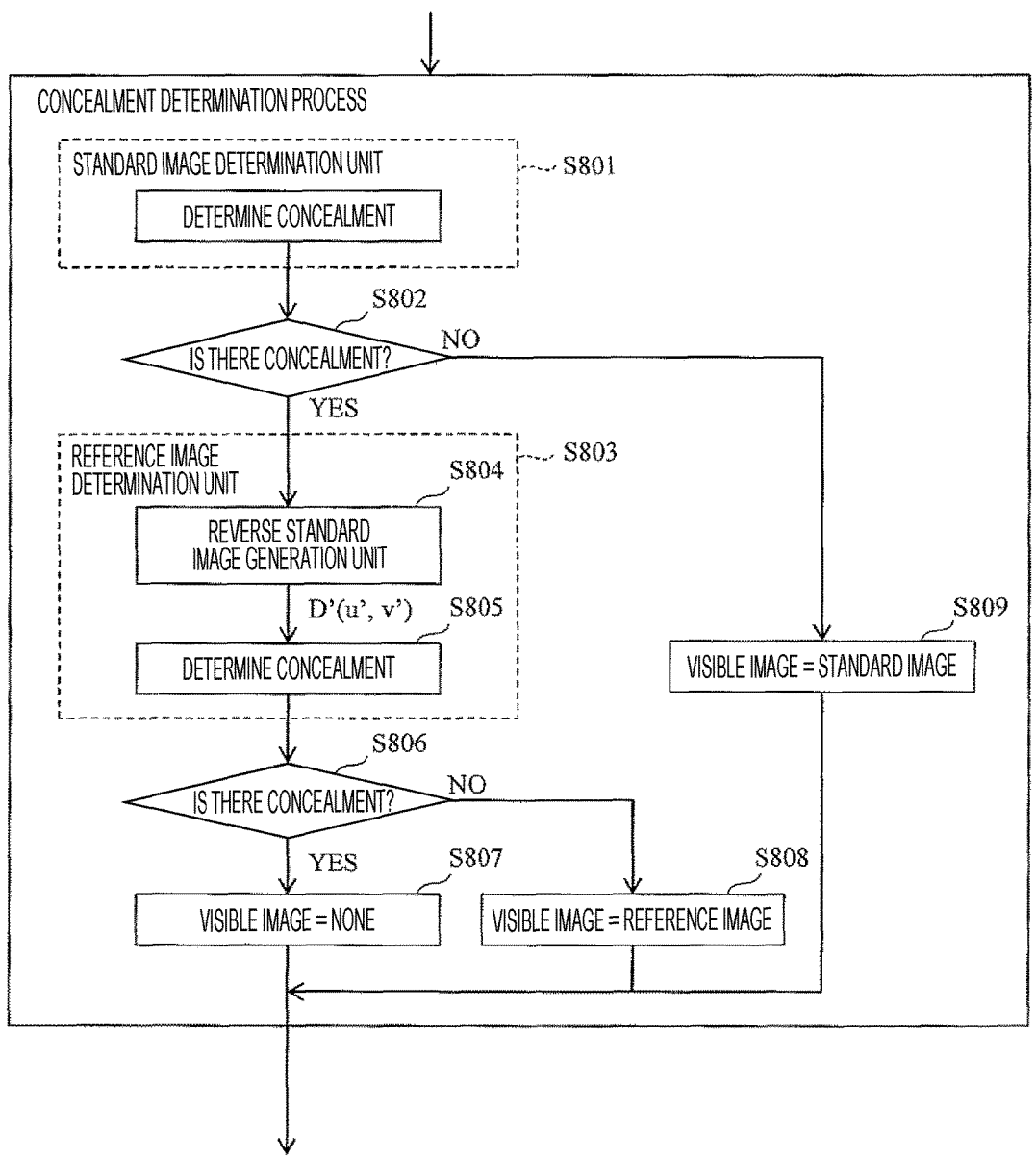
FIG. 8 is a flowchart illustrating an exemplary process of a concealment determination process.

Next, the detailed content of the concealment determination process in S715 will be described. FIG. 8 is a flowchart illustrating an exemplary process of the concealment determination process.

The concealment determination unit 607 is divided into a standard image determination unit which determines the concealment with respect to the standard image (S801) and a reference image determination unit which determines the concealment with respect to the reference image (S803). The standard image determination unit obtains the current disparity information D(up, vp) from the predicted position (up, vp) predicted based on the detection information and the vehicle behavior information in the past, and determines whether the disparity in the peripheral position tends to be changed large compared to the predicted disparity dp. As a criterion formula, the following (Equation 4) may be used.

$$D(up,vp)-dp>T1 \qquad \text{(Equation 4)}$$

In the above (Equation 4), T1 is a predetermined threshold.

Herein, in a case where the tendency of the disparity is larger than that of the predicted disparity dp (that is, the distance is shorter than predicted), it is determined that the target is concealed by the other object (that is, the concealment of the target occurs) (YES in S802). In a case where the tendency of the disparity is equal to or less than that of the predicted disparity dp, it is determined that the target is not concealed by the other object (that is, the concealment of the target does not occur) (NO in S802).

Further, in a case where the tendency of the disparity at the peripheral position is D(up, vp)=φ (invalid disparity), it is determined that the concealment of the target does not occur. Herein, the peripheral position is set based on a predicted position of the target, a size of the target, and a predicted error. For example, when the predicted errors in the vertical and horizontal directions both are ±ep, the peripheral position may be defined as a rectangular area having the left upper coordinates and the right lower coordinates as follows:

Left upper coordinates: $(up-e, vp-e)$,

Right lower coordinates: $(up+sxp+e, vp+syp+e)$.

The tendency of the disparity is determined based on excessiveness of the above condition in the rectangular area.

In the standard image determination unit (S801), in a case where it is determined that the concealment occurs in the standard image (YES in S802), the procedure moves to a reference image determination unit (S803). In a case where it is determined that the concealment of the target does not occur in the standard image (NO in S802), the visible image is output as the standard image.

In the stereo camera system, the disparity measurement unit generates the disparity image only based on any one of the images. Therefore, it cannot be confirmed whether the concealment occurs in the reference image. Therefore, a reverse standard disparity image D'(u',v') is generated in the reference image determination unit S803 (S804), and the concealment of the reference image is determined based on the reverse standard disparity image D'(u',v') (S805). The reverse standard disparity image D'(u',v') is generated by calculating a reverse standard disparity in which the left image of the reference image is changed into the standard image and the right image of the standard image is changed into the reference image.

In the concealment determination of S805, D'(up+dp, vp) is obtained using D' generated in the reverse standard disparity image generation unit S804, and it is determined whether the tendency of the disparity in the peripheral position is larger than the predicted disparity dp using the following (Equation 5).

$$D'(up',vp')-dp>T2 \quad \text{(Equation 5)}$$

In a case where the above (Equation 5) is established, it is determined that the concealment of the target occurs (YES in S806), and the output is made as no visible image (S807). On the other hand, in a case where (Equation 5) is not established, it is determined that the concealment of the target does not occur (NO in S806), and the visible image is output as the reference image (S808). The criterion formula at this time may be determined using an appropriate threshold T2 similarly to the standard image determination unit. The threshold T2 using in the above (Equation 5) is a predetermined threshold similarly to the standard image determination unit.

Figure 9:
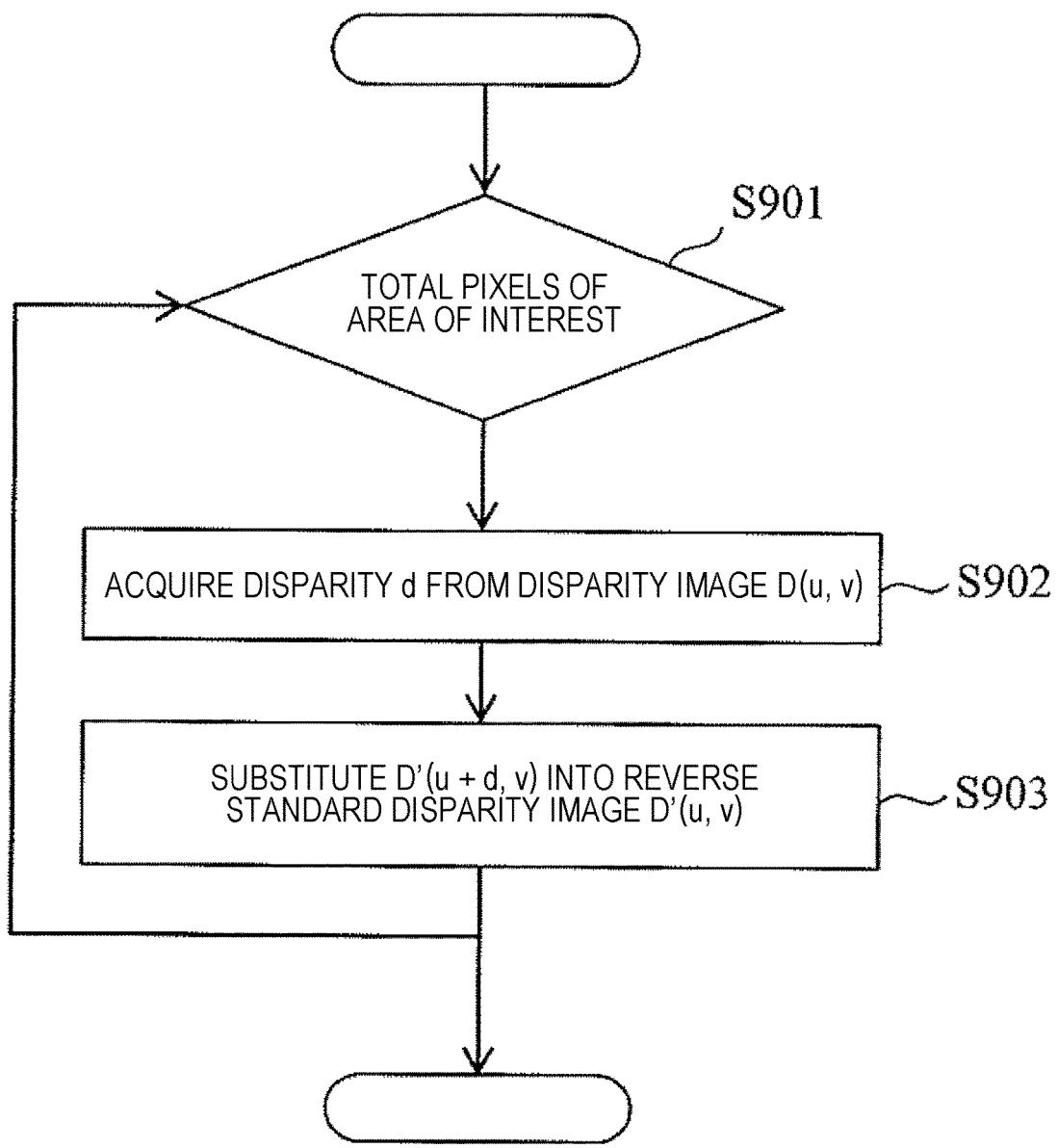
FIG. 9 is a flowchart illustrating an exemplary method of generating a reverse standard image.
Figure 10:
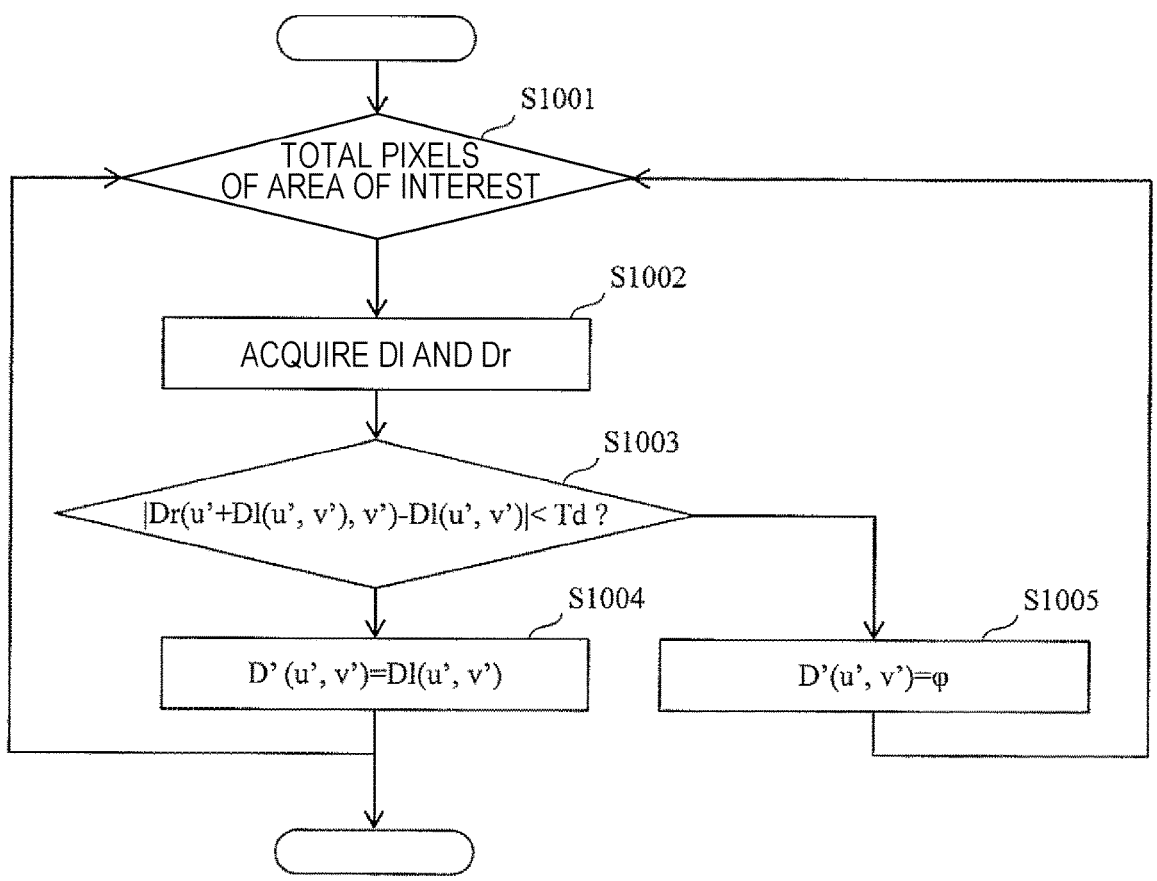
FIG. 10 is a flowchart illustrating another exemplary method of generating the reverse standard image.

While there are some methods of creating the reverse standard disparity image, the details of two types of reverse standard image generation units are illustrated in FIGS. 9 and 10 for example.

FIG. 9 is a flowchart illustrating an example of a method of generating the reverse standard image, and FIG. 10 is a flowchart illustrating another example of a method of generating the reverse standard image.

First, in the example illustrated in FIG. 9, the reverse standard disparity image D'(u',v') is generated from the disparity image D(u, v). Even when any one of the right and left images is selected as the standard image, the distance up to the object is not changed, but only the position in each image of the object is changed in the horizontal direction. A correction amount in the horizontal direction is D(u, v) similarly to the disparity. In other words, the following equation is established.

$$D'(u',v')=D'(u+D(u,v),v)=D(u,v)$$

When D(u, v)=φ is satisfied, the object does not correspond to a conversion target. A plurality of values can be obtained for D(u', v') of the above equation. In that case, for example, a larger one of the values is selected as a disparity value.

Such a reverse standard disparity image is locally generated with respect to the periphery of D'(up+dp, vp) which is obtained from the predicted position (up, vp) and the predicted disparity dp.

Next, in the example illustrated in FIG. 10, a block is created from the right image generated by the disparity measurement unit and the disparity image Dr is generated based on the right image, and a block is created from the left image and the disparity image Dl is generated based on the left image. Then, the reverse standard image is created from the generated disparity images as follows.

$$D'(u',v')=\text{if}(|Dr(u'+Dl(u',v'),v')-Dl(u',v')|<Td)$$

then Dl(u', v')

else φ

Figure 11:
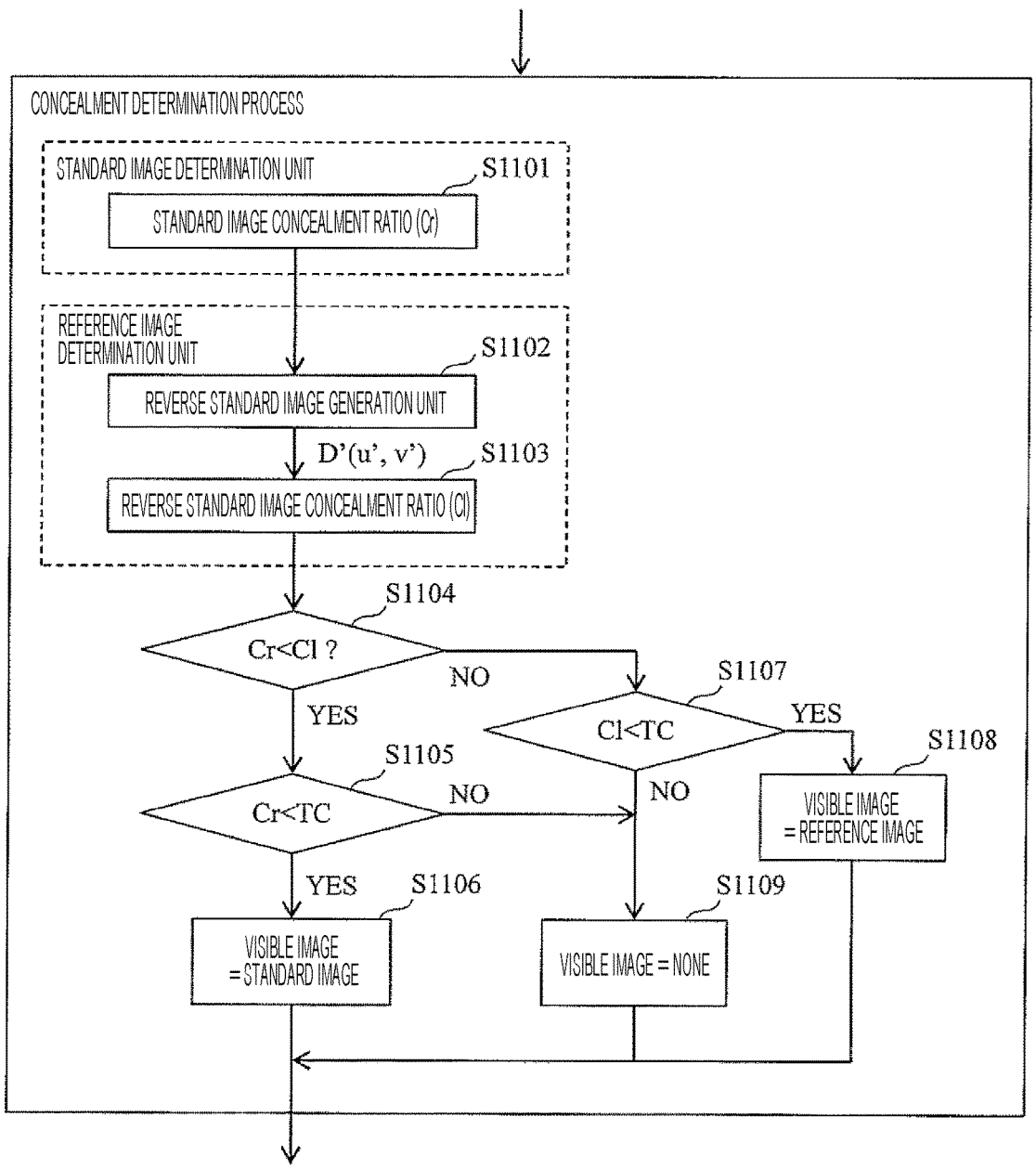
FIG. 11 is a flowchart illustrating an exemplary process of the concealment determination process based on a concealment ratio.

FIG. 11 is another example of the concealment determination process. In this example, one of the pair of images, having a small concealment ratio of the target, is selected. Herein, the concealment ratio indicates a degree that the object in front of the target blocks the target. For example, the concealment ratio is determined by a ratio of pixels satisfying (Equation 4) and (Equation 5) within a range of the target. In other words, the concealment ratios can be expressed as follows (where, Cr is a concealment ratio in the standard image, and Cl is a concealment ratio in the reference image).

$$Cr=\Sigma U(D(up,vp)-dp-T)/N$$

$$Cl=\Sigma U(D'(up',vp')-dp-T)/N$$

The function U in the above equation is a unit step function, and returns "1" when the content of the argument is equal to or more then "0" and returns "0" when the content is less than "0". "N" represents the number of pixels in an area of interest.

Making an explanation using FIG. 11, the concealment ratio of the target in the standard image is calculated by the standard image determination unit (S1101), and the concealment ratio of the target in the reference image is calculated by the reference image determination unit (S1103).

Then, the magnitude of the concealment ratios Cr and Cl is determined (S1104). In a case where the concealment ratio of the standard image is smaller than that of the reference image (Cr<Cl), and the concealment ratio Cr is smaller than an appropriate threshold TC (Cr<TC) (YES in S1104 and YES in S1105), the concealment determination process sets the visible image as the standard image (S1106).

On the other hand, in a case where the concealment ratio of the reference image is equal to or less than that of the standard image (Cr≥Cl) and the concealment ratio Cr is smaller than the appropriate threshold TC (Cr<TC) (NO in S1104 and YES in S1107), the concealment determination process sets the visible image as the reference image (S1108). Then, in a case where the concealment ratio exceeds the threshold TC at any case, the output is made as no visible image (S1109).

Figure 12:
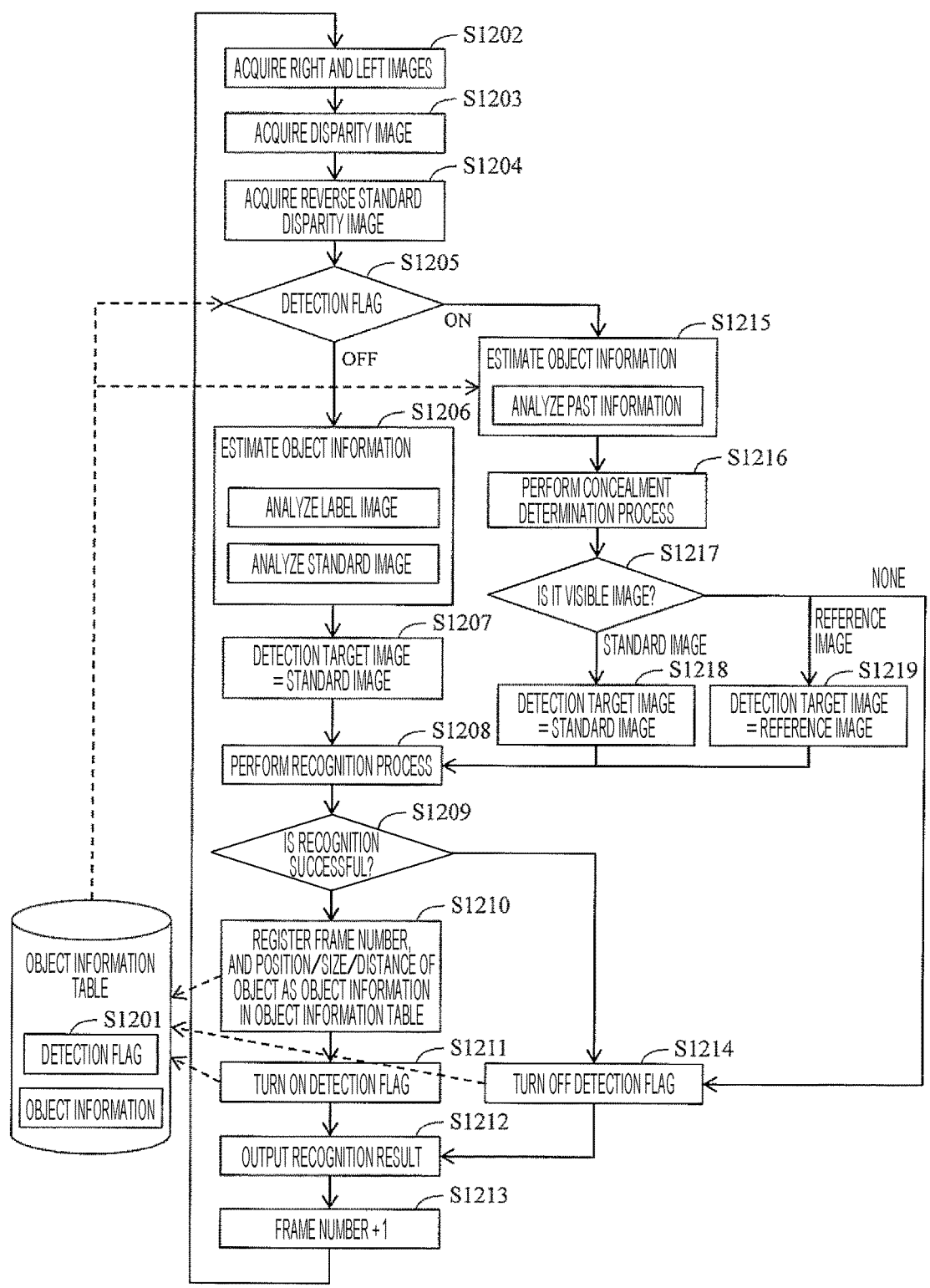
FIG. 12 is a flowchart illustrating an exemplary process of the object recognition in a case where the reverse standard image is created for the first time.
Figure 13:
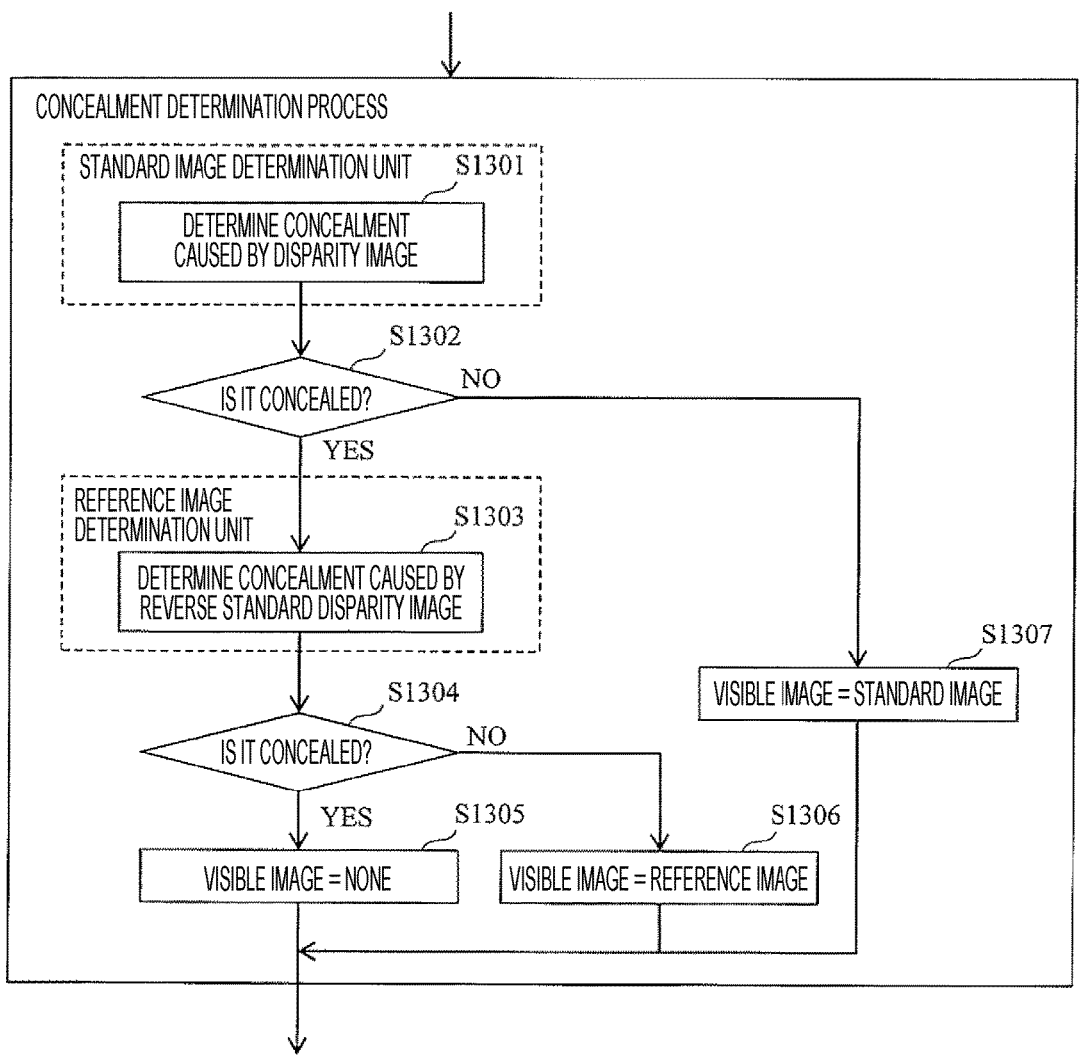
FIG. 13 is a flowchart illustrating an exemplary process of the concealment determination process in a case where the reverse standard image is created for the first time.

FIG. 12 is another example of the processing flow, and is a flowchart illustrating an exemplary process of the object recognition in a case where the reverse standard image is created for the first time. Then, FIG. 13 is a flowchart illustrating an exemplary process of the concealment determination process in a case where the reverse standard image is created for the first time.

In the exemplary process illustrated in FIG. 12, after the disparity image is acquired (S1203), the reverse standard disparity image is generated (S1204). A method of generating the reverse standard disparity image follows the flow of FIG. 9 or 10 but different in that the target area is the entire disparity image. The concealment determination process (S1216) at that time follows the flow illustrated in FIG. 13. The concealment determination is performed based on a normal disparity image in S1301. In S1303, the reverse standard disparity image is not generated unlike FIG. 8, and the reverse standard disparity image generated in S1204 is used as it is. In FIG. 8, the reverse standard disparity image is generated at every time for the target. Therefore, when there are a lot of targets, the efficiency of the process illustrated in FIG. 12 may be reasonable.

According to the vehicle-mounted recognition device, even in a case where the target is shown only in one image due to the object interposed with respect to the target, the recognition process is not performed on both image but only one image, so that a total processing time can be reduced.

Hitherto, while the embodiments of the invention have been described in detail, the invention is not limited to the embodiments, and various variations in design can be made within a scope not departing from the spirit of the invention described in claims. For example, the above embodiments have been described in detail in order to help with understanding of the invention, but there is no need to provide all the configurations. In addition, some configurations of a certain embodiment may be replaced with those of another embodiment, and the configurations of a certain embodiment may be added to another embodiment. Furthermore, additions, omissions, and substitutions may be made on some configurations of each embodiment using other configurations.

REFERENCE SIGNS LIST

601 image capture unit (left image capture unit)
602 image capture unit (right image capture unit)
603 disparity calculation unit
604 object information estimation unit
605 object recognition unit
606 object information table
607 concealment determination unit
608 image selection unit

The invention claimed is:

1. A vehicle-mounted recognition device which recognizes a target from any one of a pair of images simultaneously captured by a pair of cameras, comprising:
  a processor that is configured to
    measure a disparity using the pair of images;
    estimate a current position and a current range of the target as a predicted position and a predicted range from a past position and a past range of the target;
    determine whether concealment of the target occurs in at least one of the pair of images based on a measurement result of the processor and an estimation result of the processor;
    select a visible image, from which the target is recognizable, from the pair of images based on a determination result of the processor; and
    recognize the target using the selected visible image.

2. The vehicle-mounted recognition device according to claim 1,
  wherein the processor is configured to generate a disparity image by setting any one of the pair of images as a standard image and the other one as a reference image, and
  wherein the processor is configured to generate a reverse standard disparity image by setting the predicted range of the other image as the standard image and the predicted range of the image as the reference image.

3. The vehicle-mounted recognition device according to claim 2,
  wherein the processor is configured to generate the reverse standard disparity image based on a disparity of the disparity image.

4. The vehicle-mounted recognition device according to claim 3,
  wherein the processor is configured to calculate a predicted disparity based on the predicted position, and
  wherein the processor is configured to compare the disparity of the disparity image with the predicted disparity to determine whether the concealment of the target occurs in the standard image, and
  in a case where the processor determines that the concealment of the target occurs, compares a disparity of the reverse standard disparity image with the predicted disparity to determine whether the concealment of the target occurs in the reference image.

5. The vehicle-mounted recognition device according to claim 4,
  wherein, in a case where the processor determines that the concealment of the target does not occur in the standard image,
  the processor is configured to select the standard image as the visible image, and
  wherein, in a case where the processor determines that the concealment of the target occurs in the standard image and the processor is configured to determine that the concealment of the target does not occur in the reference image, and
  the processor is configured to select the reference image as the visible image.

6. The vehicle-mounted recognition device according to claim 4,
  wherein the processor is configured to output a ratio, when the disparity of the disparity image is smaller than the predicted disparity in the predicted range, as a concealment ratio of the standard image,
  wherein the processor is configured to calculate a ratio, when the disparity of the reverse standard disparity image is smaller than the predicted disparity in the predicted range, as a concealment ratio of the reverse standard image, and
  wherein the processor is configured to compare the concealment ratio of the standard image with the concealment ratio of the reverse standard image, and selects a small concealment ratio in the standard image and the reference image as the visible image.

* * * * *